May 21, 1968     A. W. TURNER, JR     3,384,351
GRASS GUARD FOR FENCE

Filed Nov. 18, 1966     6 Sheets-Sheet 1

ARVIN WILLIAM TURNER, JR.
INVENTOR.

BY

ATTORNEY

May 21, 1968   A. W. TURNER, JR   3,384,351
GRASS GUARD FOR FENCE

Filed Nov. 18, 1966   6 Sheets-Sheet 2

ARVIN WILLIAM TURNER, JR.
INVENTOR.

BY

ATTORNEY

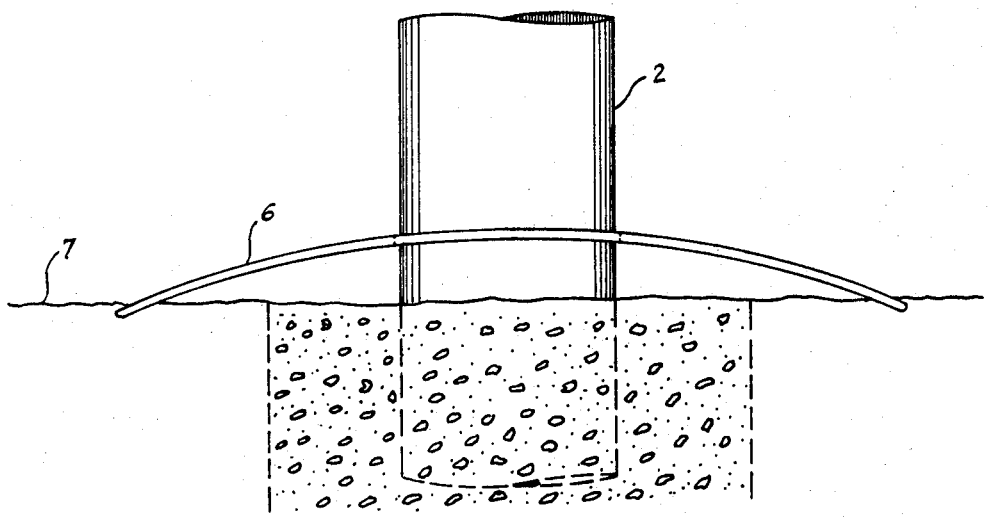
FIG. 5
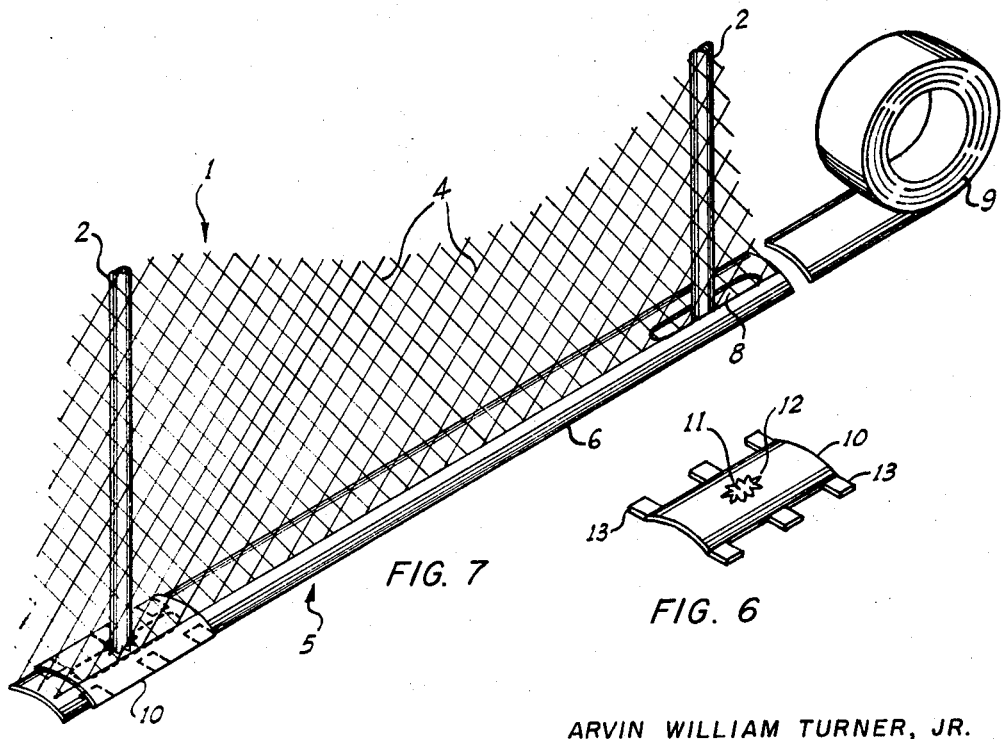
FIG. 7
FIG. 6
ARVIN WILLIAM TURNER, JR.
INVENTOR.
ATTORNEY May 21, 1968 A. W. TURNER, JR 3,384,351
GRASS GUARD FOR FENCE Filed Nov. 18, 1966 6 Sheets-Sheet 4

ARVIN WILLIAM TURNER, JR.
INVENTOR.

BY

ATTORNEY

May 21, 1968     A. W. TURNER, JR     3,384,351

GRASS GUARD FOR FENCE

Filed Nov. 18, 1966     6 Sheets-Sheet 5

ARVIN WILLIAM TURNER, JR.
INVENTOR.

BY

ATTORNEY

May 21, 1968     A. W. TURNER, JR     3,384,351
GRASS GUARD FOR FENCE

Filed Nov. 18, 1966     6 Sheets-Sheet 6

ARVIN WILLIAM TURNER, JR.
INVENTOR.

BY

ATTORNEY

United States Patent Office 3,384,351
Patented May 21, 1968

3,384,351
GRASS GUARD FOR FENCE
Arvin William Turner, Jr., 109 Lindenwood Drive,
Fort Worth, Tex. 76107
Filed Nov. 18, 1966, Ser. No. 595,398
5 Claims. (Cl. 256—32)

ABSTRACT OF THE DISCLOSURE

A grass curb or barrier for use in association with a fence to prevent the growth of grass and weeds along the fence line. The invention comprises a strip of flexible sheet material, coextensive with the length of a fence, which in use is arranged on the ground, longitudinally of the fence and below it. The material of the strip is arched transversely intermediate its longitudinal edges, and is characterized by its inherent spring tension. The material of the strip is relatively wider than the fence and extends beyond opposite sides thereof, and has openings therein for engagement by the fence posts.

---

This invention relates to a grass guard for a fence, and it concerns more particularly a novel grass curb or barrier for use in association with a fence to prevent the growth of grass and weeds along the fence line.

Concrete curbs have sometimes been employed along fence lines to prevent the growth of grass and weeds, and to facilitate mowing and edging. Such concrete curbs are comparatively expensive, however, and take time to install, as determined by prevailing weather conditions.

An object of this invention is to provide simple and less expensive means for accomplishing the same purposes, but which at the same time is of light weight, readily portable and easy to install, efficient in operation and durable in use, and attractive in its appearance.

An advantageous feature of the invention is that it may be readily installed in the field without use of special tools.

In one application thereof the invention is suitable for use with metal fences of the chain link type, but it is not necessarily so limited. The invention is also applicable to wood fences of all types.

In its simplest form the invention comprises a strip of flexible sheet material, coextensive with the length of a fence, which in use is arranged on the ground, longitudinally of the fence and below it. The material of the strip, which may be metal, plastic, rubber, or other suitable material, as desired, is relatively wider than the fence and extends beyond opposite sides thereof, and has openings therein for engagement by the fence posts.

The strip of flexible sheet material as described which comprises the grass guard of the invention is arched transversely intermediate its longitudinal edges, and is characterized by its inherent spring tension.

The invention will be readily understood by referring to the following description and the accompanying drawing, in which:

FIG. 5 is a sectional elevational view on an enlarged scale taken on the line 5—5 of FIG. 2;

FIG. 6 is a perspective view showing a cover plate as hereinafter described;

FIG. 7 is a fragmentary perspective view showing a portion of the fence as illustrated in FIGS. 1 to 6, showing one of the cover plates in place and showing a portion of the fence paneling;

Figure 1:
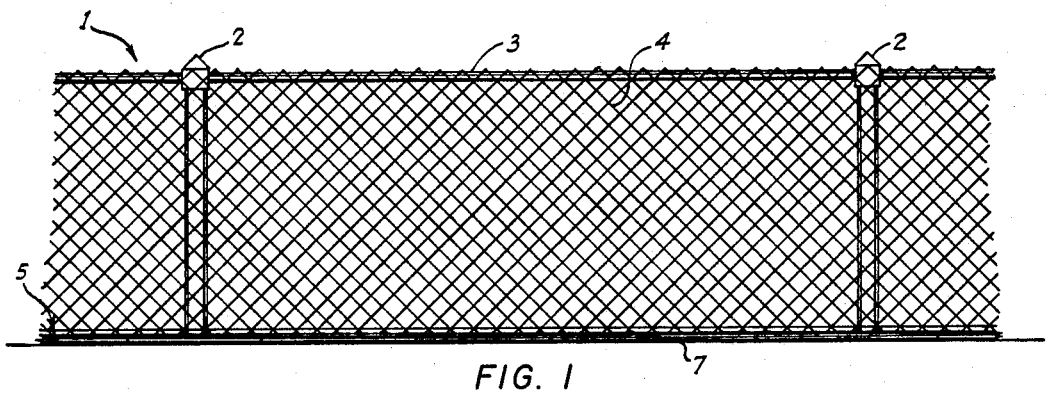
FIG. 1 is a side elevational view showing a portion of a conventional chain link fence having a grass guard embodying the invention operatively positioned relative thereto.

Referring to FIGS. 1 to 13 of the drawing, the numeral 1 designates generally a portion of a conventional metal fence of the chain link type having regularly spaced posts 2, two of which are shown in FIGS. 1 to 3, and 7, and having a top rail 3 extending between the posts 2, and having open weave wire paneling 4 secured to one side thereof, in the usual manner.

The numeral 5 indicates generally a grass guard embodying the invention, as hereinafter described, which comprises a strip of flexible sheet material 6, coextensive with the length of the fence 1, which is arranged on the ground, indicated by the numeral 7, longitudinally of the fence 1 and below it.

Figure 4:
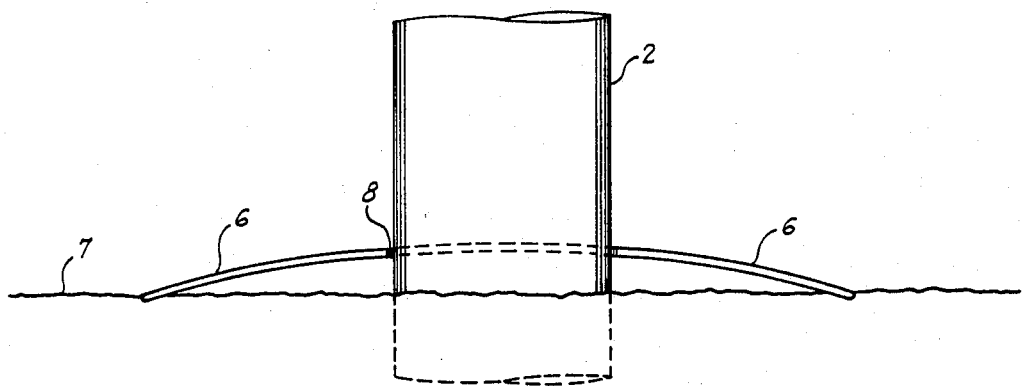
FIG. 4 is a sectional elevational view on an enlarged scale taken on the line 4—4 of FIG. 2.

The material of the strip 6, which may be metal, plastic, rubber, or other suitable material, is arched transversely intermediate its longitudinal edges, as shown best in FIGS. 4 and 5, and is characterized by its inherent spring tension.

Figure 3:
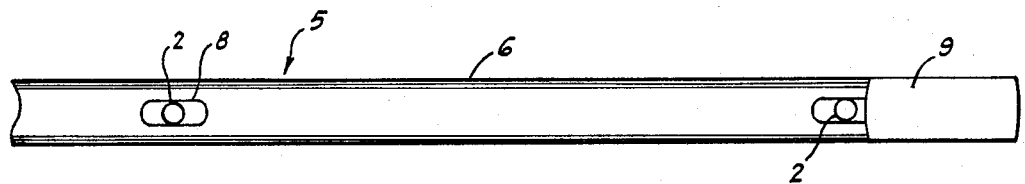
FIG. 3 is a sectional plan view taken on the line 3—3 of FIG. 2.

As shown in FIGS. 3 and 7, the strip 6 is relatively wider than the fence 1 and extends laterally outwardly beyond it.

The strip 6 has longitudinally spaced slots 8 therein, which are relatively longer and wider than the diameter of the posts 2, for engagement by the posts 2, in their erected positions, as the strip 6 is applied thereto during erection of the fence 1.

The dimensions of the slots 8 facilitate alignment of the slots 8 with the posts 2 although the spacing of the posts 2 relative to each other may not be precisely uniform.

Figure 2:
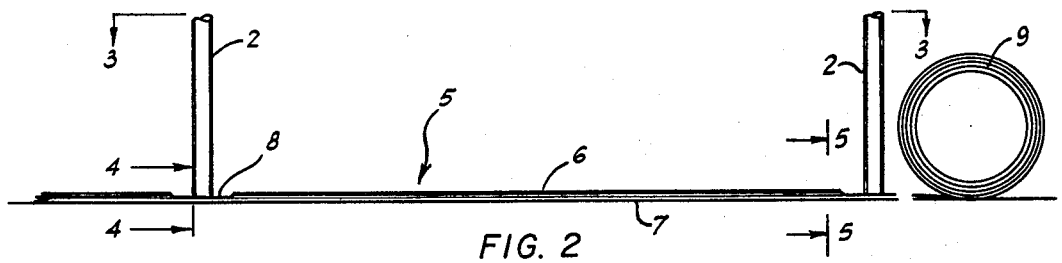
FIG. 2 is an elevational view showing the posts only of a fence as illustrated in FIG. 1 in their erected positions, and showing a continuous strip of flexible sheet material, which comprises the grass guard shown in FIG. 1, applied to the ground along the fence line, with the openings thereof surrounding the posts, as in erecting the fence, before applying the fence paneling to the posts.

The numeral 9 designates a roll of strip material corresponding to the strip 6, a portion of which, as shown in FIGS. 2, 3, and 7, has been unwound and severed therefrom for application to the fence 1.

Figure 8:
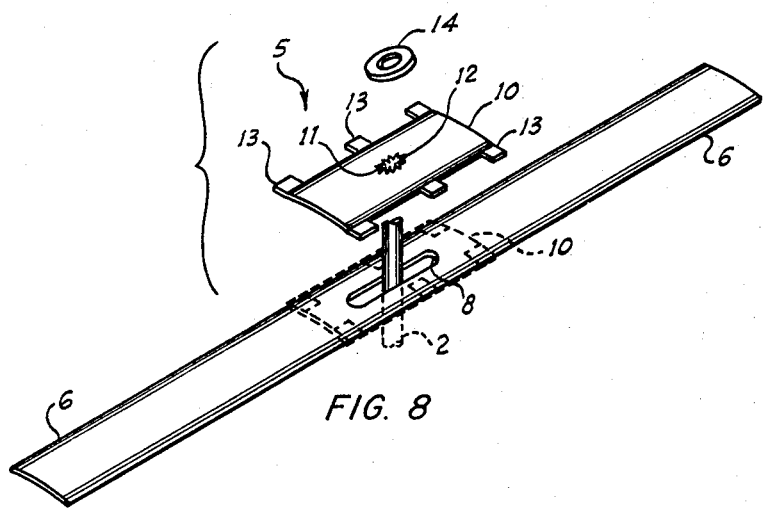
FIG. 8 is a fragmentary, exploded perspective view showing a portion of the strip material as illustrated in FIGS. 4 and 5 in association with an adjacent fence post, and showing a cover plate which in its operative position, shown in broken lines, overlies the strip material and has means positively securing it against displacement relative thereto, immediately surrounding the post.

A cover plate 10, shown in FIGS. 6 to 8, which comprises a short piece of material similar to the material of the strip 6, overlies the strip 6 at its juncture with each of the posts 2.

A hole 11, smaller than the transverse dimensions of the post 2, and having a serrated peripheral edge 12, is provided in the cover plate 10 for frictional engagement with the post to positively prevent displacement of the cover plate 10 relative to the post 2.

The cover plate 10 has tabs 13 extending laterally outwardly from its longitudinal edges which in the operative position of the cover plate 10, shown in broken lines in FIGS. 7 and 8, are folded under the adjacent edges of the strip 6 to thereby positively secure the cover plate 10 against displacement relative to the strip 6.

A resilient sealing ring 14, shown in FIG. 8, is applied to each of the posts 2 immediately above the respective cover plates 10 whereby the annulus between the posts 2 and the hole 11 in the cover plate 10 is positively sealed.

Figure 9:
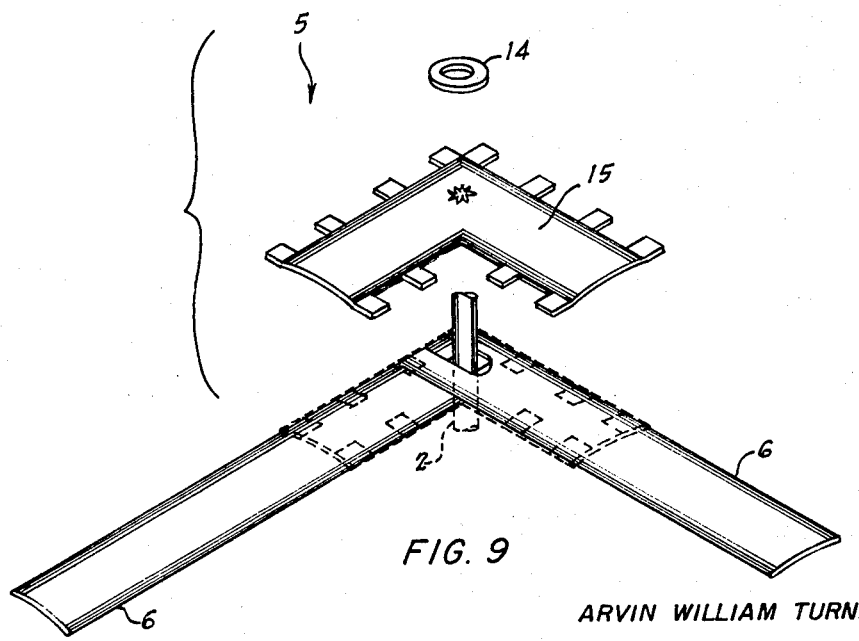
FIG. 9 is a view similar to FIG. 8 showing an arrangement suitable for use at a corner of the fence.

FIG. 9 shows an arrangement, suitable for use at the corners of the fence 1, in which two adjoining sections of the strip 6 are arranged perpendicular to each other and a special right angular cover plate 15, which corresponds to the cover plate 10 shown in FIGS. 6 to 8, is applied thereto.

Figures 10, 12:
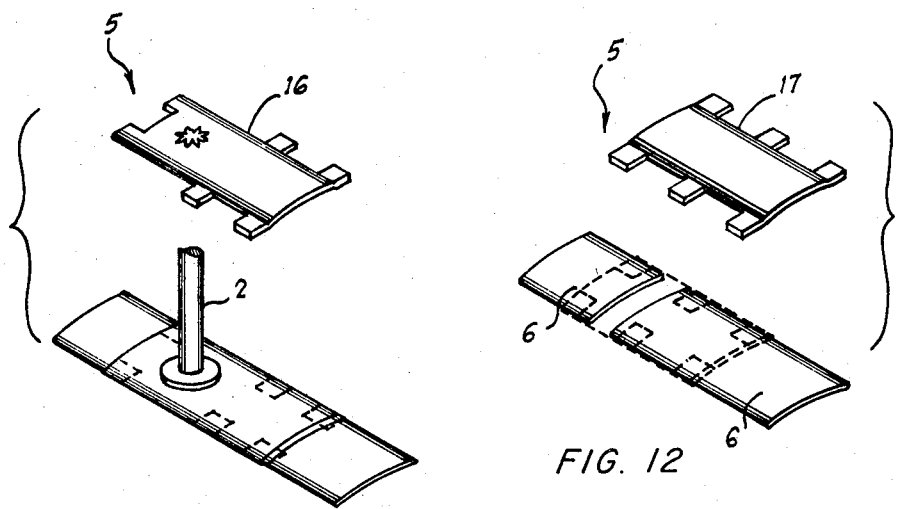
FIG. 10 is a view similar to FIG. 8 showing an arrangement suitable for use at one end of the fence, or at a gate.
FIG. 12 is a fragmentary, exploded perspective view showing an imperforate cover plate which in its operative position, shown in broken lines, overlie the adjacent ends of two adjoining portions of the strip material and has means positively securing it against displacement relative thereto, for splicing the strip material.

FIG. 10 shows an arrangement, suitable for use at one end of the fence 1, or at a gate, in which a terminal portion of the strip 6 is positioned adjacent an end post or gate post 2, and a special cover plate 16, which is relatively shorter than the cover plate 10 and has both end tabs and side tabs corresponding to the tabs 13, is applied thereto.

Figure 11:
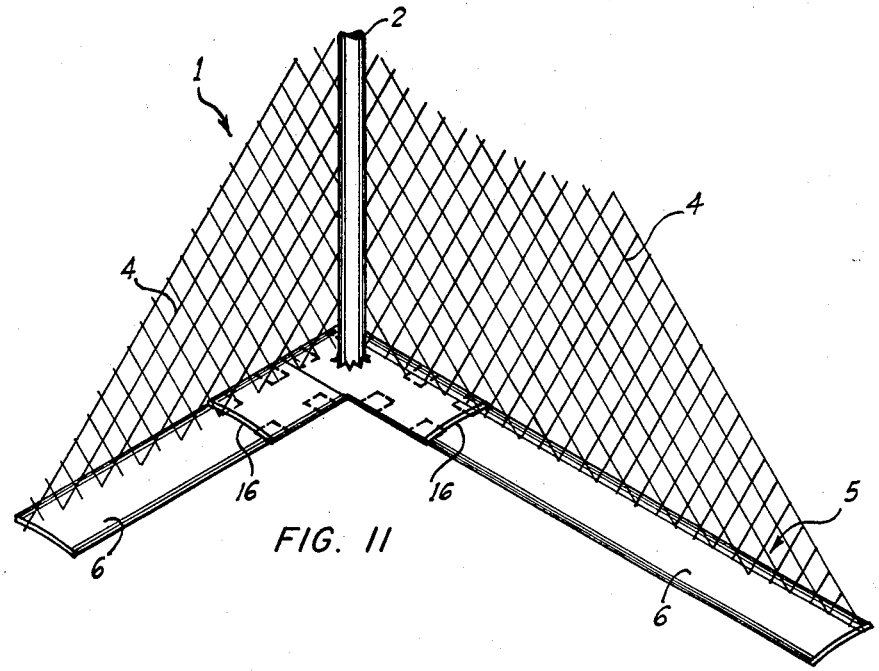
FIG. 11 is a fragmentary perspective view showing another arrangement suitable for use at a corner of the fence.

FIG. 11 shows an arrangement in which two of the special cover plates 16 shown in FIG. 10, which are arranged perpendicular to each other, are substituted for the right angular cover plate 15 shown in FIG. 9.

FIG. 12 shows an arrangement in which a cover plate 17, which is similar to the cover plate 10 but is imperforate, overlies the adjacent ends of two adjoining portions of the strip material 6, and has means securing it against displacement therefrom, for use in splicing the strip 6.

Figure 13:
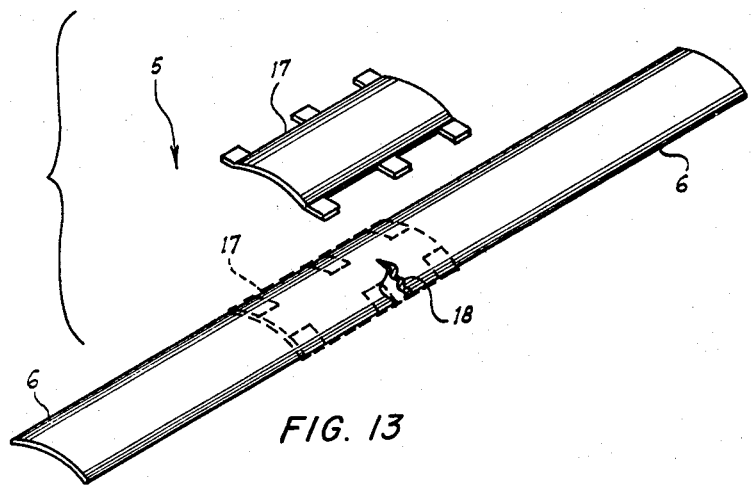
FIG. 13 is a fragmentary, exploded perspective view showing an imperforate cover plate, similar to the cover plate shown in FIG. 12, which in its operative position, shown in broken lines, overlies a damaged portion of the strip material and has means positively securing it against displacement relative thereto.

FIG. 13 shows an arrangement in which an imperforate cover plate 17, as illustrated in FIG. 12, is applied to one side of a damaged portion of the strip material 6, which as shown is torn, as at 18, for use in patching or repairing the strip 6.

Figure 14:
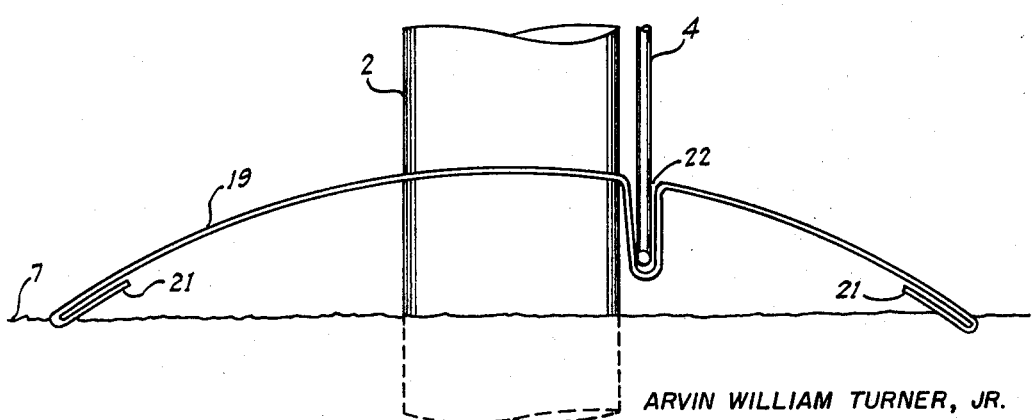
FIGS. 14 and 15 are views similar to FIGS. 5 and 8, respectively, showing another form of the invention.
Figure 15:
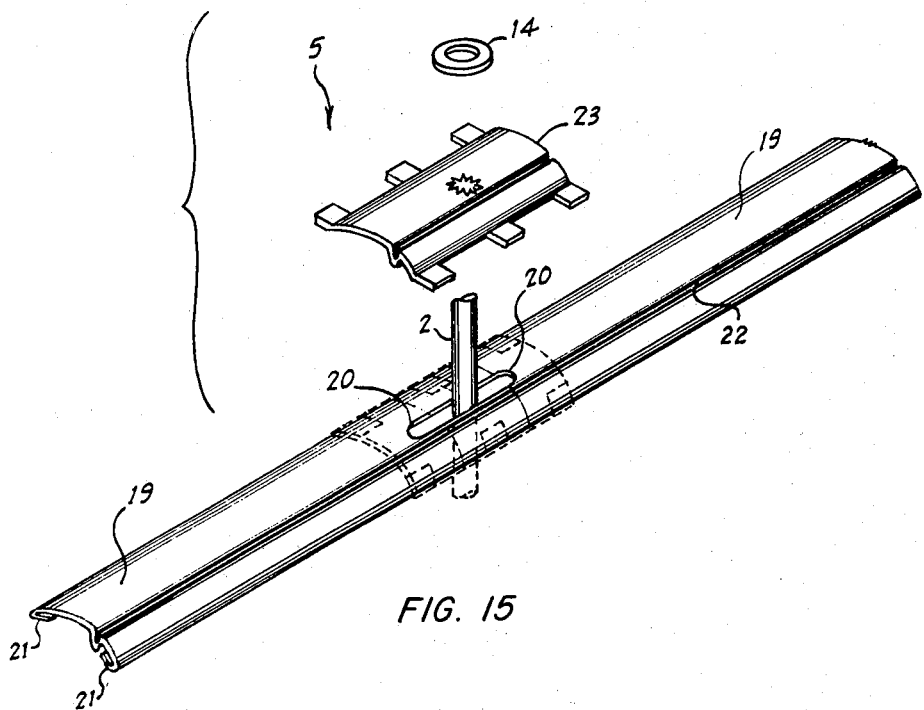

In the form of the invention shown in FIGS. 14 and 15 of the drawing, a strip 19, which corresponds to the strip 6 shown in FIGS. 1 to 13, comprises a plurality of sections each having a length corresponding substantially to the distance between two of the posts 2.

The sections which comprise the strip 19 have longitudinal indentations 20 beginning at their opposite ends corresponding to the slots 8. The adjacent ends of two adjoining sections of the strip 19, which may overlap to a greater or lesser extent, embrace between them the corresponding post 2.

The strip 19 has marginal portions thereof folded downwardly and inwardly upon themselves along its longitudinal edges, as at 21, whereby its structure is reinforced.

The strip 19 has an upwardly facing groove 22 extending along one side thereof for engagement by the lower longitudinal edge of the fence paneling 4.

A cover plate 23, which corresponds to the cover plate 10 shown in FIGS. 6 to 8, is conformable to the strip 19.

The invention as shown in FIGS. 14 and 15, by slight modification, as desired, is readily applicable to existing fences.

Figure 16:
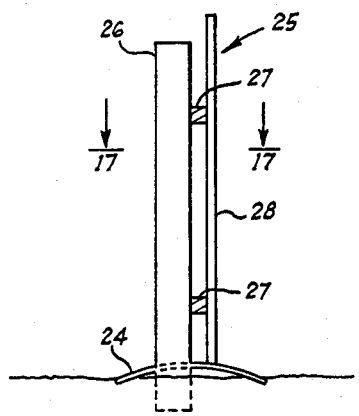
FIG. 16 is a sectional elevational view, taken on the line 16—16 of FIG. 17, showing still another form of the invention as applied to a wood fence of the picket type.
Figure 17:
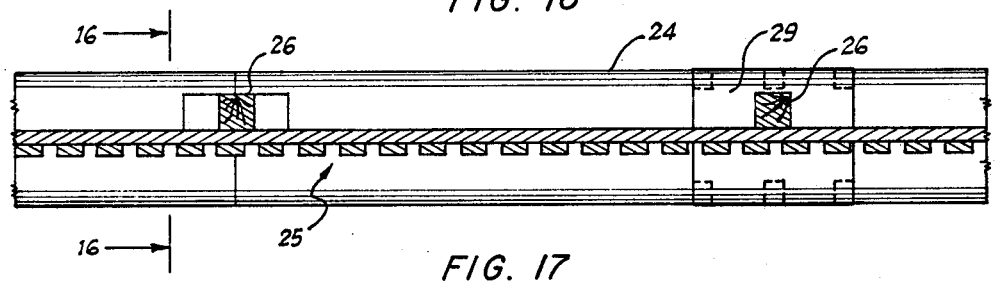
FIG. 17 is a sectional plan view, taken on the line 17—17 of FIG. 16.

FIGS. 16 and 17 show an arrangement in which a relatively wider strip 24, which corresponds to the strip 6 shown in FIGS. 1 to 13, is applied to a wood fence of the picket type, designated generally by the numeral 25, having posts 26, longitudinally extending rails 27, and paneling 28. The numeral 29 indicates a cover plate corresponding to the cover plate 10.

Because of the relatively greater width of the wood fence 25, the strip 24 is substantially wider than the strips 6 and 19 above described, and is offset laterally relative to the posts 26.

The invention may be modified in various ways without departing from the spirit and scope thereof.

I claim:

1. In combination with a fence having posts in predetermined spaced apart relation to each other, the combination of a grass curb or barrier comprising a strip of flexible sheet material, coextensive with the length of the fence, arranged on the ground along the fence line, below the fence, the material of the strip being arched transversely intermediate its longitudinal edges and being characterized by its inherent spring tension, the material of the strip being relatively wider than the fence and extending beyond opposite sides thereof, and having openings therein surrounding the fence posts, and a cover plate of like material overlying the strip at its juncture with each of the posts, the cover plate having an opening therein fitting closely around the post and having means engageable with the post to prevent displacement of the plate relative to the post, and having other means engageable under the longitudinal edges of the strip to prevent displacement of the plate relative to the strip.

2. In combination with a fence having posts in predetermined spaced apart relation to each other, the combination of a grass curb or barrier comprising a strip of flexible sheet material, coextensive with the length of the fence, arranged on the ground along the fence line, below the fence, the material of the strip being arched transversely intermediate its longitudinal edges and being characterized by its inherent spring tension, the material of the strip being relatively wider than the fence and extending beyond opposite sides thereof, and having openings therein surrounding the fence posts, the strip comprising a plurality of longitudinal sections of like material each having a length corresponding substantially to the distance between two of the posts, and the adjacent ends of adjoining sections being connected substantially end to end, the strip having marginal portions thereof folded downwardly and inwardly upon themselves along its longitudinal edges, whereby its structure is reinforced, and having an upwardly facing longitudinal groove extending along one side thereof in underlying engagement with the lower edge of the fence paneling.

3. In combination with a fence having posts in predetermined spaced apart relation to each other, the combination of a grass curb or barrier comprising a strip of flexible sheet material, coextensive with the length of the fence, arranged on the ground along the fence line, below the fence, the material of the strip being arched transversely intermediate its longitudinal edges and being characterized by its inherent spring tension, the material of the strip being relatively wider than the fence and extending beyond opposite sides thereof, and a cover plate of like material overlying the strip at its juncture with each of the posts, the cover plate having an opening therein fitting closely around the post and having means engageable with the post to prevent displacement of the plate relative to the post, and having other means engageable under the longitudinal edges of the strip to prevent displacement of the plate relative to the strip.

4. In combination with a fence having posts in predetermined spaced apart relation to each other, the combination of a grass curb or barrier comprising a strip of flexible sheet material, coextensive with the length of the fence, arranged on the ground along the fence line, below the fence, the material of the strip being arched transversely intermediate its longitudinal edges and being characterized by its inherent spring tension, the material of the strip being relatively wider than the fence and extending beyond opposite sides thereof, and having openings therein surrounding the fence posts, and a cover plate of like material overlying the strip at its juncture with each of the posts, the cover plate having an opening therein fitting closely around the post and having means engageable with the post to prevent displacement of the plate relative to the post, and having other means engageable with the strip to prevent displacement of the plate relative to the strip.

5. In combination with a fence having posts in predetermined spaced apart relation to each other, the combination of a grass curb or barrier comprising a strip of flexible sheet material, coextensive with the length of the fence, arranged on the ground along the fence line, below the fence, the material of the strip being arched transversely intermediate its longitudinal edges and being characterized by its inherent spring tension, the material of the strip being relatively wider than the fence and extending beyond opposite sides thereof, and a cover plate of like material overlying the strip at its juncture with each of the posts, the cover plate having means engageable with the post to prevent displacement of the plate relative to the post.

References Cited

UNITED STATES PATENTS

| | | | |
|---|---|---|---|
| 379,688 | 3/1888 | Dennis | 287—20.92 X |
| 1,139,515 | 5/1915 | Haas | 52—102 |
| 1,195,697 | 8/1916 | Lord | 52—102 |
| 2,017,210 | 10/1935 | Kirsch | 287—20.92 X |
| 2,826,393 | 3/1958 | Miller | 256—19 |
| 2,978,837 | 4/1961 | Daniels | 47—25 |

DAVID J. WILLIAMOWSKY, *Primary Examiner.*

DENNIS L. TAYLOR, *Examiner.*